United States Patent [19]

Tateoka et al.

[11] 4,380,390
[45] Apr. 19, 1983

[54] EXPOSURE CORRECTING DEVICE

[75] Inventors: Masamichi Tateoka, Tokyo; Kazuo Minoura, Yokohama, both of Japan

[73] Assignee: Canon Kabushiki Kaisha, Tokyo, Japan

[21] Appl. No.: 199,505

[22] Filed: Oct. 22, 1980

[30] Foreign Application Priority Data

Oct. 29, 1979 [JP] Japan .............................. 54-140044
Sep. 24, 1980 [JP] Japan .............................. 55-133202

[51] Int. Cl.³ ........................................... G03B 27/72
[52] U.S. Cl. ........................................ 355/71; 355/51
[58] Field of Search ................ 355/67, 68, 71, 74, 355/51

[56] References Cited

U.S. PATENT DOCUMENTS 3,469,916  9/1969  Sloan .................................. 355/51
3,926,518 12/1975  Berry et al. ........................ 355/68
3,967,894  7/1976  Tsilibes ............................. 355/67

OTHER PUBLICATIONS

IBM Technical Disclosure Bulletin, "Variable-Aperture Stop for a Reciprocating Lens Copier Design", vol. 17, No. 4, Sep. 1974, Smith.

*Primary Examiner*—Alan Mathews
*Attorney, Agent, or Firm*—Fitzpatrick, Cella, Harper & Scinto

[57] ABSTRACT

A light-shield plate for correcting the ununiform exposure distribution in an original reading apparatus for example a facsimile resulting from so-called cosine fourth power rule is composed of an easily produceable single member having an arc of a radius R and is positioned in front of or behind an imaging lens at an axial distance L from the lens and at a perpendicular distance H from the center of the arc to the optical axis in such a manner as to be parallel to the light beam entering or emerging from the lens corresponding to the longitudinal direction of the illuminated area on the original and as that the amounts L, H and R are selected to satisfy a certain relationship.

4 Claims, 14 Drawing Figures

EXPOSURE CORRECTING DEVICE

BACKGROUND OF THE INVENTION

1. Field of the Invention

The present invention relates to an exposure correcting device for use in an original reading apparatus such as a facsimile.

2. Description of the Prior Art

In an original reading apparatus in which a slit area of an original illuminated by a light source is projected in a reduced scale through a lens onto a solid-state imaging device for original reading, the amount of light on the focal plane is larger in the central area than in the peripheral area due to the cosine fourth power rule of the lens even if the original is evenly illuminated. Such uneven exposure has been corrected by increasing the intensity of illuminating light source in the peripheral area by $1/\cos^4$ times with respect to that in the central area.

Such correction however requires a special light source, such as a halogen lamp having discrete filaments which are made longer in the peripheral area than in the central area.

On the other hand, U.S. Pat. No. 3,469,916 discloses the use of a light-shield plate, in the light path from the original to the lens, of a shape capable of compensating the light loss resulting from the cosine fourth power rule.

Such a light-shield plate is however generally difficult to manufacture of the special shape thereof and poses difficult adjustment since the distribution of exposure is changed if the mounting position is rotated from the normal position.

SUMMARY OF THE INVENTION

The object of the present invention is to provide an exposure correcting device which is easy in manufacture and adjustment and is capable of compensating the uneven exposure distribution resulting from the so-called cosine fourth power rule of the lens, thus enabling to project the illuminated area of the original onto a solid-state imaging device at the image plane with a uniform intensity, even if there is employed a light source of uniform intensity such as a fluorescent lamp.

The above-mentioned object is achieved by the use of a light-shield plate containing an arc of a radius R positioned at an axial distance L from the lens and at a perpendicular distance H of the center of the arc from the optical axis, wherein said R, L and H are so selected as to satisfy the following relations:

In case the light-shield plate is positioned in front of the lens, or between the lens and the original;

$$\frac{13.5}{32}L^2 - \frac{1}{5.3} < H < \frac{29}{32}L^2 - 1$$

$H - R < 0.2$ (cm)

in which L is measured from the front face of the lens; and in case the light-shield plate is positioned behind the lens, or between the lens and the image plane;

$10L^2 - 18L + 10 < H < 21L^2 - 40L + 24$ and $H - R < 0.2$ (cm)

in which L is measured from the rear face of the lens.

DESCRIPTION OF THE PREFERRED EMBODIMENTS

Figure 1:
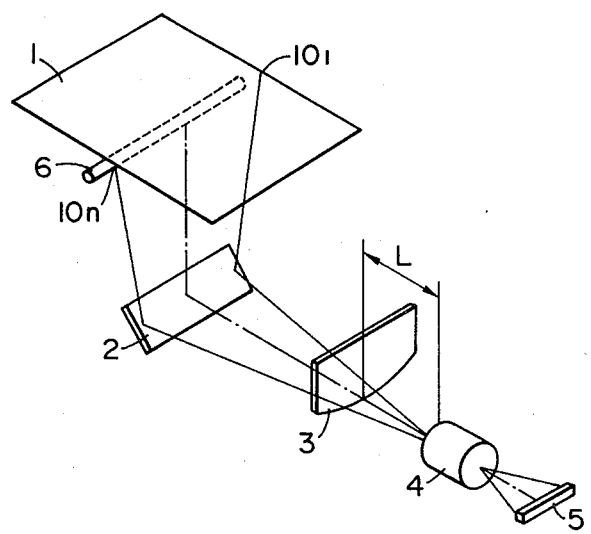
FIG. 1 is a perspective view of a first embodiment of the reading apparatus utilizing the present invention.
Figure 2:
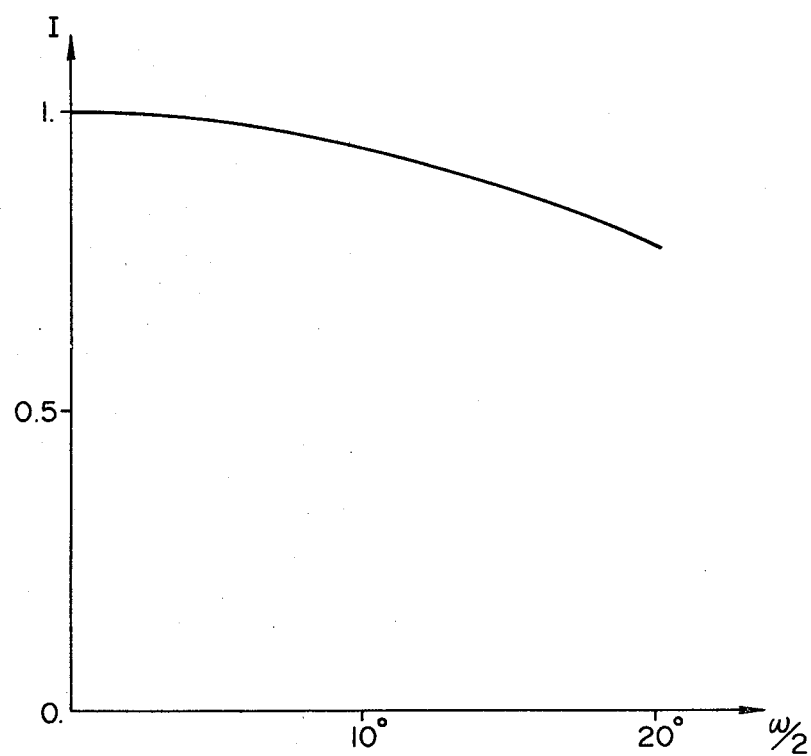
FIG. 2 is a chart showing the exposure distribution resulting from so-called cosine fourth power rule of the lens.

FIG. 1 shows the first embodiment of the reading apparatus utilizing the present invention in a perspective view, wherein a light-shield plate 3 is positioned in the optical path and between an original plane 1 and a lens 4. The original plane 1 is illuminated with a light source 6, and the light beam reflected by the original plane 1 is guided by a mirror 2 and focused by the lens 4 onto a solid-state imaging device 5. Without said light-shield plate 3, the exposure on the solid-state imaging device 5 becomes uneven due to the so-called cosine fourth power rule of the lens 4. The exposure distribution in such case is shown in FIG. 2, wherein the abscissa represents the half-image angle $\omega/2$ of the lens 4 while the ordinate represents the amount of exposure I which is normalized as unity with respect to the light beam received from an object point on the optical axis without said light-shield plate.

Figure 3:
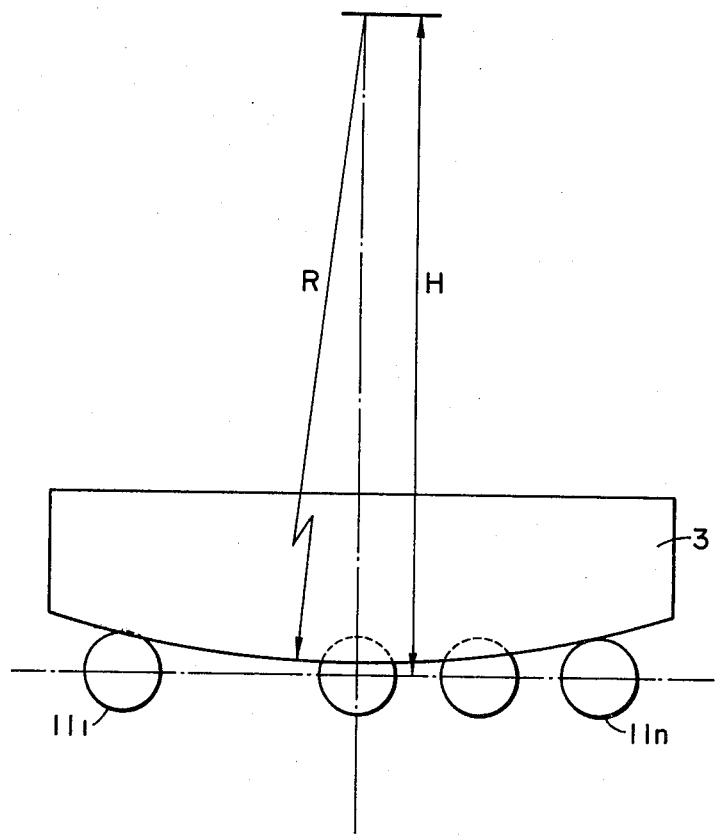
FIG. 3 is an explanatory view of the light-shield plate employed in the first embodiment.

FIG. 3 shows the light-shield plate of the present invention viewed from the entrance side of the lens 4 in FIG. 1, wherein H is the distance of the center of arc from a plane containing the optical axis of the lens 4 and the photoreceptor cells of the solid-state imaging device 5, while R is the radius of the arc, and $11_1, 11_2, \ldots, 11_n$ are different light beams entering the lens 4 from the original plane 1, corresponding from an end $10_1$ to the other end $10_n$ in FIG. 1. As will be apparent from FIG. 3, the light beams emerging from the central area of the oblong illuminated zone on the original are more shielded by the plate 3 than those emerging from the peripheral areas of said zone, whereby there is obtained an effect of compensating the unevenness resulting from the cosine fourth power rule. In the following there will be given a quantitative explanation.

Figure 4:
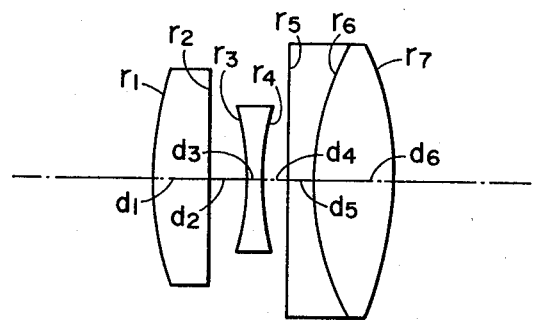
FIG. 4 is a schematic view of the lens to be employed in the present invention.

FIG. 4 shows a schematic view of a lens to be employed in the present invention, wherein r1, r2, ..., r7 are radii of curvature of the lens faces; d1, d2, ..., dn are lens thicknesses and lens gaps; n1, n2, ..., n4 are refractive indexes of the lenses to the line E (5461 Å); and $\nu 1, \nu 2, \ldots, \nu 4$ are Abbe numbers. Numerical data of the lens are shown in the following:

r1 = 0.4146, d1 = 0.0906, n1 = 1.69401, $\nu 1$ = 548
r2 = −7.2484, d2 = 0.0648
r3 = −0.6537, d3 = 0.0254, n2 = 1.61686, $\nu 2$ = 370 r4=0.3657, d4=0.0571,
r5=−4.3272, d5=0.0317, n3=1.70443, ν3=301
r6=0.3574, d6=0.1508, n4=1.81077, ν4=409
r7=−0.5571.

The focal length f=1 mm, the F=number is equal to 4, and the half-image angle ω/2=20°.

Now there will be explained the correction of exposure on the image plane by means of the light-shield plate of the present invention. As explained in the foregoing, the distance L is measured from the front face of the lens as shown in FIG. 1, H is the distance of the center of the arc from the optical axis, and R is the radius of the arc of the light-shield plate.

The uniformity of exposure distribution is achieved when L and H are so selected as to satisfy the following relation, which is represented in the unit of centimeters:

$$\frac{13.5}{32} L^2 - \frac{1}{5.3} < H < \frac{29}{32} L^2 - \frac{1}{8}$$

If the value of H becomes smaller than the lower limit, the exposure in the peripheral areas becomes higher than that in the central area, while, if the value of H becomes larger than the upper limit, the exposure loss in the peripheral areas is not compensated.

Also the relation between R and H is determined by the ratio of exposure on the optical axis with and without the light-shield plate. In the case of a half-image angle of 20°, H and R are preferably so selected as to satisfy the following relation in order to select said ratio in the range of 70%:

H−R<0.2

Figure 5:
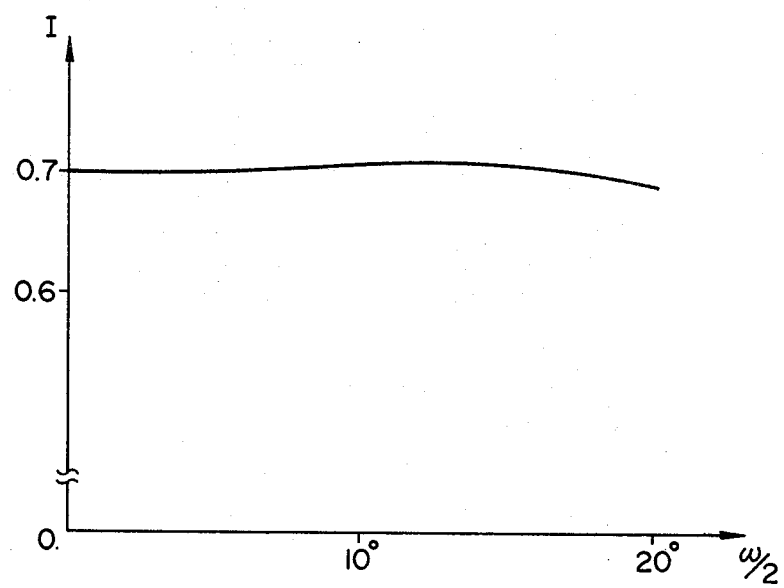
FIGS. 5 to 9 are charts showing the exposure distribution in various numerical examples of the light-shield plate in the first embodiment.
Figure 6:
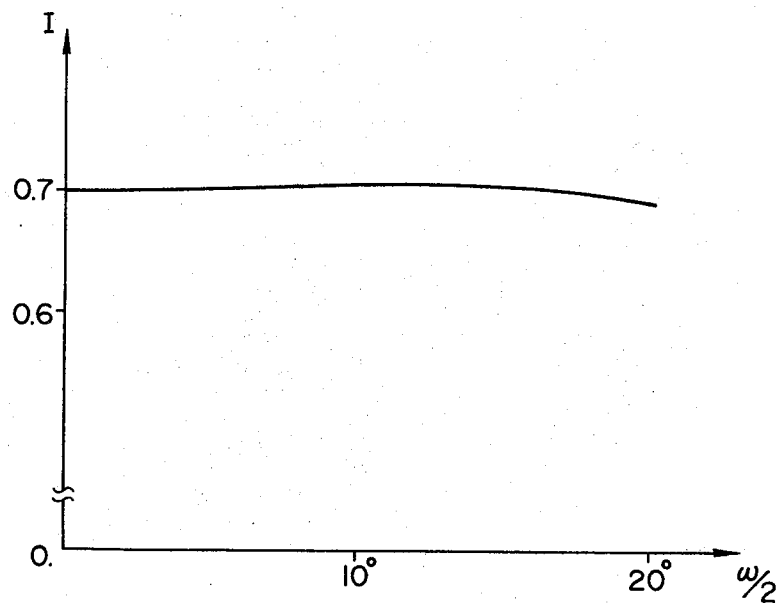
Figure 7:
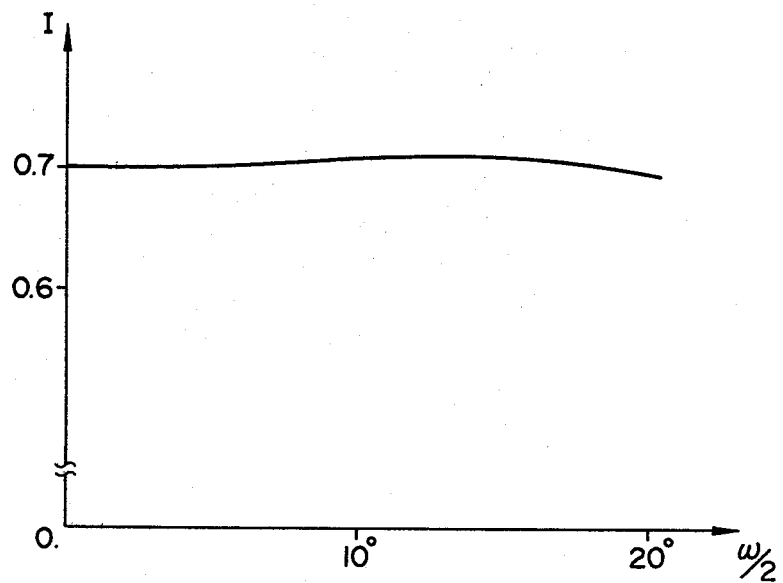
Figure 8:
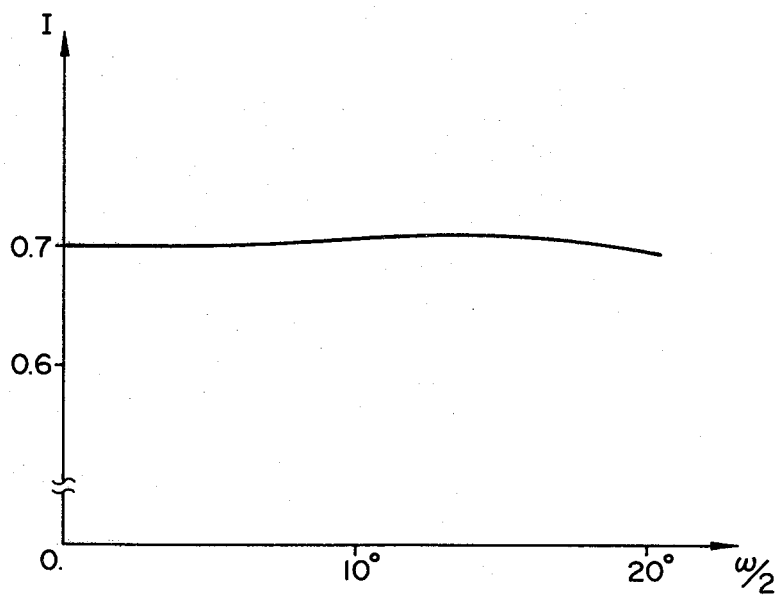

FIGS. 5 to 9 show the exposure distribution in various numerical examples, wherein:

FIG. 5 shows a case in which L=2 cm, H=2 cm and R=1.92 cm;

FIG. 6 shows a case in which L=4 cm, H=9.5 cm and R=9.4 cm;

FIG. 7 shows a case in which L=3.8 cm, H=9.5 cm and R=9.4 cm;

FIG. 8 shows a case in which L=6 cm, H=2.2 cm and R=2.19 cm; and

Figure 9:
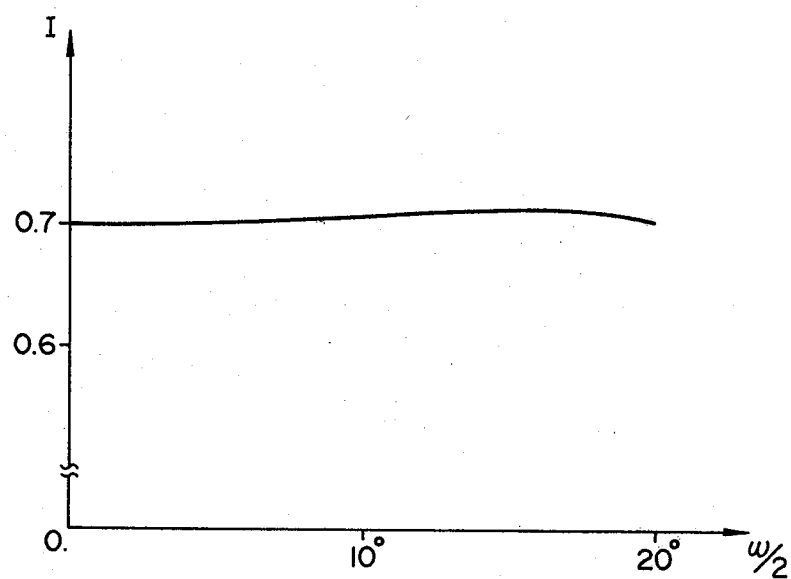

FIG. 9 shows a case in which L=8 cm, H=39.5 cm and R=39.41 cm.

Figure 10:
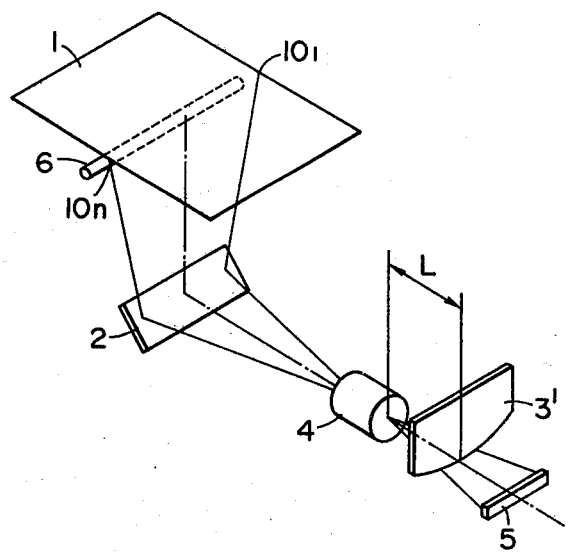
FIG. 10 is a perspective view of a second embodiment of the reading apparatus utilizing the present invention.

FIG. 10 shows a second embodiment of the reading apparatus utilizing the present invention, wherein a light-shield plate 3′ is positioned between a lens 4 and a solid-state imaging device 5. Without said light-shield plate 3′, the solid-state imaging device 5 will be subjected to an uneven exposure distribution due to the cosine fourth power rule of the lens 4 as shown in FIG. 2.

Figure 11:
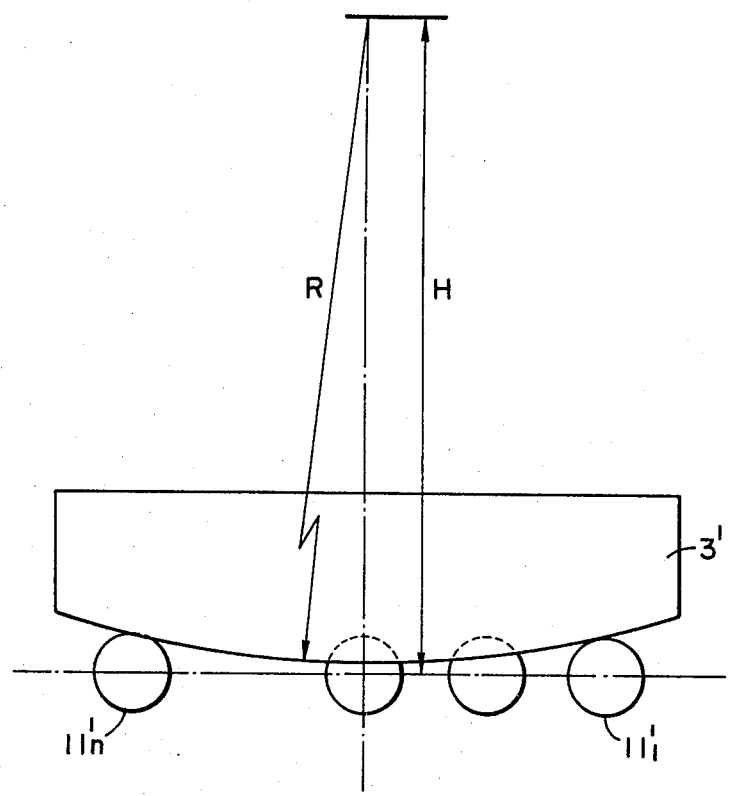
FIG. 11 is an explanatory view of the light-shield plate employed in the second embodiment.

FIG. 11 illustrates the light-shield plate 3′ employed in said second embodiment. Since the optical system is a reduction imaging system, the effective light beams in front of and behind the lens 4 are mutually different, so that the light-shield plate 3′ is of a different form from that shown in FIG. 3.

FIG. 11 shows the system in FIG. 10 viewed from the entrance side of the lens 4, wherein H is the distance of the arc from a plane containing the optical axis of the lens 4 and the photoreceptor cells of the solid-state imaging device 5, R is the radius of said arc, and $11_1'$, $11_2'$, ..., $11_n'$ are light beams emerging from the original 1 and guided through the lens 4, respectively corresponding from an end $10_1$ to the other end $10_n$ of said original 1.

As will be apparent from FIG. 11, the light beam emitted from the central area of the oblong illuminated zone on the original is more shielded by the light-shield plate 3′ than those emitted from the peripheral areas, whereby there is obtained an effect for compensating the uneven exposure distribution resulting from the cosine fourth power rule of the lens.

Now, there will be explained the correction of exposure on the image plane by means of the light-shield plate of the present invention. As explained in the foregoing, the distance L is measured from the rear face of the lens, H is the distance of the center of arc from the optical axis, and R is the radius of arc of the light-shield plate.

The uniformity of exposure distribution is achieved when L and H are so selected as to satisfy the following relation, which is represented in the unit of centimeters:

$10L^2 - 18L + 10 < H < 21L^2 - 40L + 24$

If the value of H becomes smaller than the lower limit, the exposure in the peripheral areas becomes higher than that in the central area, while, if the value of H becomes larger than the upper limit, the exposure loss in the peripheral areas is not compensated.

Also the relation between R and H is determined by the ratio of exposure on the optical axis with and without the light-shield plate. In case of a half-image angle of 20°, H and R are preferably so selected as to satisfy the following relation in order to select said ratio in the range of 70%:

H−R<0.2

Figure 12:
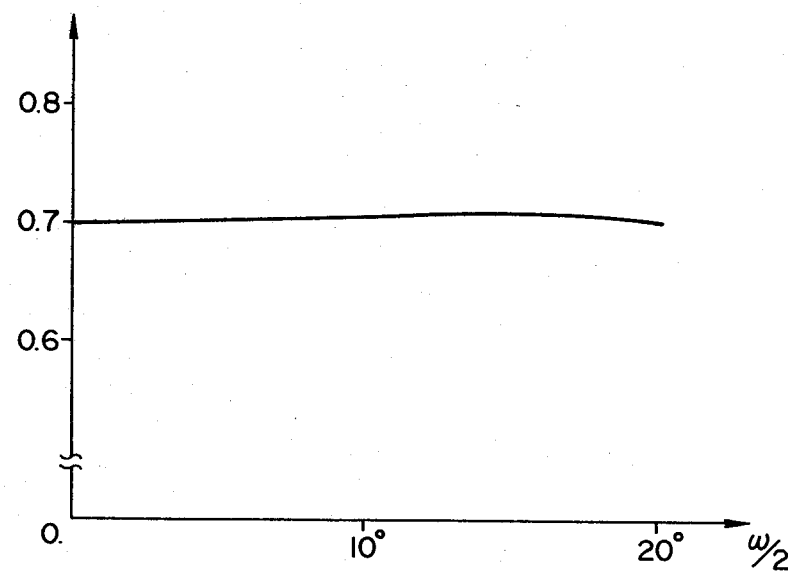
FIGS. 12 to 14 are charts showing the exposure distribution in various numerical examples of the light-shield in the second embodiment.
Figure 13:
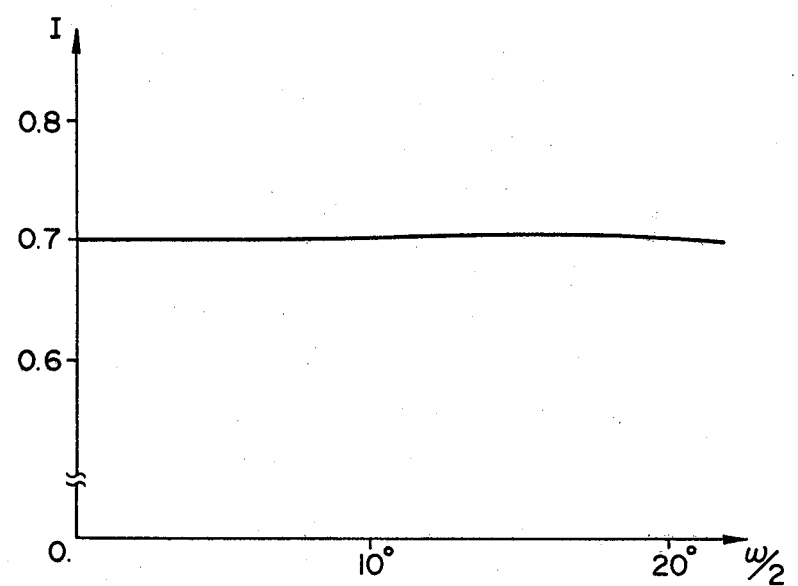
Figure 14:
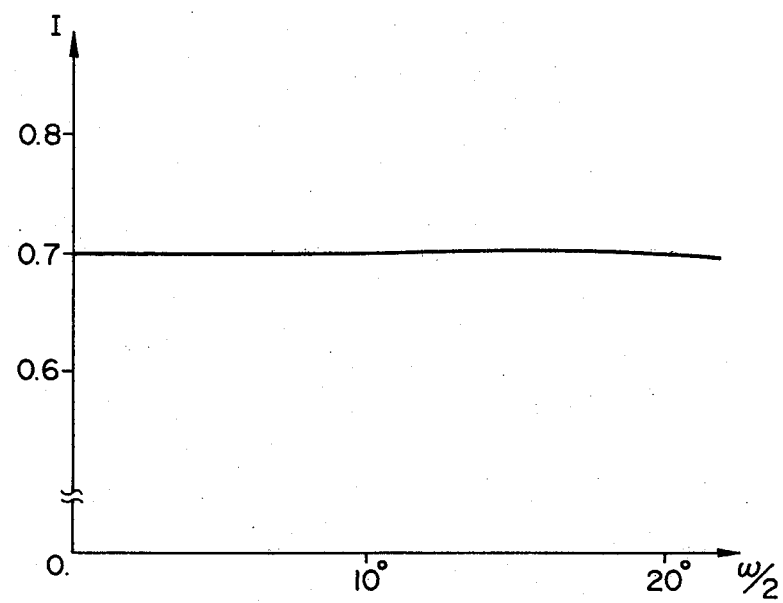

FIGS. 12 to 14 show the exposure distribution in various numerical examples, wherein:

FIG. 12 shows a case in which L=1 cm, H=3 cm and R=2.95 cm;

FIG. 13 shows a case in which L=1.5 cm, H=7.5 cm and R=7.46 cm; and

FIG. 16 shows a case in which L=2 cm, H=20 cm and R=19.98 cm.

Although the foregoing explanation has been limited to a reduction optical system, the present invention is similarly applicable to a magnifying or equimagnification optical system.

As detailedly explained in the foregoing, the present invention provides an exposure correcting device utilizing a light-shield plate containing an arc which is easy and inexpensive in manufacture and allows an easy adjustment when mounting.

What we claim is:

1. An exposure correcting device comprising:
    a light source for illuminating an original plane with light of longitudinally uniform intensity;
    a lens for projecting a predetermined illuminated zone of said original plane onto a predetermined zone of an image plane; and
    a light-shield plate having a surface contour defined by an arc of a circle of predetermined radius, said light-shield plate being disposed in a plane approximately perpendicular to the optical axis of said lens in such a manner that the center of the circle is positioned at a predetermined axial distance from said lens and at a predetermined perpendicular distance from the optical axis of said lens, to thereby produce a substantially uniform exposure on said image plane;
    wherein said light-shield plate is positioned between said original plane and said lens in such a manner that the radius R of said circle, the axial distance L of the center of said circle from the front face of said lens and the perpendicular distance H of said center from the optical axis are selected so as to satisfy the following relations represented in centimeters:

$$\frac{13.5}{32} L^2 - \frac{1}{5.3} < H < \frac{29}{32} L^2 - 1$$

and $H - R < 0.2$.

2. An exposure correcting device comprising:
a light source for illuminating an original plate with light of longitudinally uniform intensity;
a lens for projecting a predetermined illuminated zone of said original plane onto a predetermined zone of an image plane; and
a light-shield plate having a surface contour defined by an arc of a circle of predetermined radius, said light-shield plate being disposed of said lens in such a manner that the center of the circle is positioned at a predetermined axial distance from said lens and at a predetermined perpendicular distance from the optical axis of said lens, to thereby produce a substantially uniform exposure on said image plane;
wherein said light-shield plate is positioned between said lens and said imaging plane in such a manner that the radius R of said circle, the axial distance L of the center of said circle from the rear face of said lens and the perpendicular distance H of said center from the optical axis are selected so as to satisfy the following relations represented in centimeters:
$10L^2 - 18L + 10 < H < 21L^2 - 40L + 24$ and $H - R < 0.2$.

3. An exposure correcting device, comprising:
a light source for illuminating an original plane with light of longitudinally uniform intensity;
a lens for projecting a predetermined illuminated zone of said original plane onto a predetermined zone of an image plane; and
a light-shield plate having an edge the entire surface contour of which is defined by an arc of a circle of predetermined radius, said light-shield plate being disposed in a plane approximately perpendicular to the optical axis of said lens in such a manner that the center of the circle is positioned at a predetermined axial distance from said lens and at a predetermined perpendicular distance from the optical axis of said lens, to thereby produce a substantially uniform exposure on said image plane.

4. An exposure correcting device, comprising:
a light source for illuminating an original plane with light of longitudinally uniform intensity;
a lens for projecting a predetermined illuminated zone of said original plane onto a predetermined zone of an image plane;
a solid image-pickup element disposed on said image plane and receiving light from the illuminated zone of said original plane; and
a light-shield plate having a surface contour defined by an arc of a circle of predetermined radius, said light-shield plate being disposed in a plane approximately perpendicular to the optical axis in such a manner that the center of the circle is positioned at a predetermined axial distance from said lens and at a predetermined perpendicular distance from the optical axis of said lens, to thereby produce a substantially uniform exposure on said solid image pickup element.

* * * * *